United States Patent [19]

Yamada et al.

[11] Patent Number: 5,628,700
[45] Date of Patent: May 13, 1997

[54] PULLEY DEVICE FOR CONTINUOUSLY VARIABLE TRANSMISSION

[75] Inventors: Masahiko Yamada, Nagoya; Toshio Yamaguchi, Hadano; Kiyofumi Tanaka, Machida, all of Japan

[73] Assignees: Nissan Moter Co, Ltd., Yokohama; Aichi Machine Industry Co., Ltd., Aichi, both of Japan

[21] Appl. No.: 494,815

[22] Filed: Jun. 26, 1995

[30] Foreign Application Priority Data

Jun. 27, 1994 [JP] Japan ................... 6-144889
Jun. 27, 1994 [JP] Japan ................... 6-144890

[51] Int. Cl.⁶ ............................................... F16H 59/00
[52] U.S. Cl. ..................................... 474/18; 474/28
[58] Field of Search ................. 474/18, 28; 477/45–49

[56] References Cited

U.S. PATENT DOCUMENTS

| | | | |
|---|---|---|---|
| 4,261,213 | 4/1981 | Rattunde | 474/18 X |
| 4,292,031 | 9/1981 | Rattunde | 474/18 |
| 4,439,170 | 3/1984 | Steuer | 474/28 |
| 4,494,942 | 1/1985 | Hirano et al. | 474/28 |
| 4,850,936 | 7/1989 | Nakamura | 474/28 |

*Primary Examiner*—Roger J. Schoeppel
*Attorney, Agent, or Firm*—Foley & Lardner

[57] ABSTRACT

A pulley device for a continuously variable transmission includes a shaft having first and second ends, the second end being formed with two axially separated ring grooves. A C-shaped ring is engaged with one of the two ring grooves disposed near to a movable conical plate. A ring-shaped retainer is arranged to restrain radial movement of the C-shaped ring. A snap ring is engaged with the other of the two ring grooves to restrain an axial position of the retainer.

12 Claims, 6 Drawing Sheets

PULLEY DEVICE FOR CONTINUOUSLY VARIABLE TRANSMISSION

BACKGROUND OF THE INVENTION

The present invention relates to a pulley device for a continuously variable V-belt transmission.

Conventionally, continuously variable V-belt transmissions comprise a drive shaft to which torque is transmitted from a drive source, and a side cover constituting a casing and rotatably supported to the drive shaft at one end thereof through a bearing. Arranged to the drive shaft is a drive pulley comprising a stationary conical plate which rotates together with the drive shaft, and a movable conical plate arranged opposite to the stationary conical plate to form a V-shaped pulley groove and being movable in the axial direction of the drive shaft, i.e. in the direction to part from the stationary conical plate by a hydraulic pressure operating in a drive pulley cylinder chamber.

The drive pulley cylinder chamber is formed on the rear side of the movable conical plate which does not face the stationary conical plate, and defined by a piston member and a cylinder member. The drive pulley cylinder chamber receives a hydraulic pressure through oil holes formed in the drive shaft and the movable conical plate.

The one end of the drive shaft with the bearing has a smaller diameter than a slide portion with which the movable conical plate is outwardly engaged (hereafter refer to this one end as a reduced diameter portion), the reduced diameter portion having an end with the outer periphery formed with a male screw. The bearing engaged with the reduced diameter portion and a coupling portion of the piston member are integrally coupled together in the state pressed against the slide portion by a nut meshed with the male screw.

Specifically, as for a procedure of coupling the bearing and the piston member together, the cylinder member is coupled with the movable conical plate, and then the movable conical plate is outwardly engaged with the slide portion of the drive shaft to cooperate with the stationary conical plate to form the V-shaped pulley groove. Next, a first ring member is outwardly engaged with the reduced diameter portion to restrict the movable range of the movable conical plate, i.e. the most distant position from the stationary conical plate. The coupling portion of the piston member is outwardly engaged with the reduced diameter portion, and a second ring member is outwardly engaged therewith to set a fixed position of the piston member. After engaging the bearing with the reduced diameter portion, the nut is meshed with the male screw to couple the movable conical plate and the piston member with the drive shaft.

When meshing the nut with the male screw, tightening is carried out at a predetermined torque using a torque wrench or the like so as not to have the nut loosed by vibrations.

Finally, the side cover having an inner wall designed to be in press contact with the outer periphery of the bearing is arranged to conceal the one end of the drive shaft.

However, the conventional pulley device for a continuously variable V-belt transmission has the following problems:

First, forming of the male screw on the drive shaft needs a finishing process such as thread polishing, anti-carbonization treatment or the like, resulting in a large increase in machining cost of the drive shaft.

Second, upon tightening of the nut, not only torque control is needed to prevent loosening of the nut as described above, but the coupling portion of the piston member should be put in the caulked state to improve a fluid tightness of the drive pulley cylinder chamber. Thus, caulking control is needed upon tightening of the nut, resulting in the highly increased number of processes of the assembling work.

Third, a cost reduction is not expectable due to not only the problem of machining cost of the drive shaft, but the problem of assembling of the pulley device which requires a great deal of labor and time.

Fourth, as for the structure that the outer periphery of the bearing is in press contact with the inner wall of the side cover, if the bearing is outwardly engaged with the reduced diameter portion in an axially shifted position thereof, a clearance is produced between the outer periphery of the bearing and the inner wall of the side cover, resulting in a possible wear of the bearing due to rotation thereof. Therefore, the conventional structure that tightening of the nut ensures also positioning of the bearing makes assembling of the pulley device more complex.

It is, therefore, an object of the present invention to provide a pulley device for a continuously variable V-belt transmission which enables a cost reduction by the simplified assembling work with reliability improved.

SUMMARY OF THE INVENTION

According to one aspect of the present invention, there is provided a pulley device for a continuously variable transmission, comprising:

a casing;

a shaft rotatably supported to said casing, said shaft having first and second ends, said second end being formed with groove means;

a first conical plate fixed to said first end of said shaft;

a second conical plate axially movably engaged with said second end of said shaft, said second conical plate cooperating with said first conical plate to form a V-shaped groove;

chamber means engaged with said shaft for defining a hydraulic pressure cylinder chamber adjacent to said second conical plate on the side thereof falling to face said first conical plate, said hydraulic pressure cylinder chamber receiving hydraulic pressure to axially move said second conical plate; and ring means engaged with said groove means for restraining axial movement of said chamber means.

Another aspect of the present invention lies in providing a pulley device for a continuously variable transmission, comprising:

a casing;

a shaft rotatably supported to said casing, said shaft having first and second ends, said second end being formed with groove means, said groove means including two axially separated ring grooves formed on an outer periphery of said second end;

a first conical plate fixed to said first end of said shaft;

a second conical plate axially movably engaged with said second end of said shaft, said second conical plate cooperating with said first conical plate to form a V-shaped groove;

chamber means engaged with said shaft for defining a hydraulic pressure cylinder chamber adjacent to said second conical plate on the side thereof failing to face said first conical plate, said hydraulic pressure cylinder chamber receiving hydraulic pressure to axially move said second conical plate;

ring means engaged with said groove means for restraining axial movement of said chamber means, said ring means including a ring engaged with one of said two ring grooves disposed near to said second conical plate, a retainer arranged to restrain radial movement of said ring, and a snap ring engaged with the other of said two ring grooves to restrain an axial position of said retainer; and a bearing engaged with said second end of said shaft and having outer and inner races, said bearing being disposed more distant from said second conical plate than said ring means, said casing being formed with a recess having a diameter substantially equal to a diameter of said outer race of said bearing.

Still another aspect of the present invention lies in providing a pulley device for a continuously variable transmission, comprising:

a casing;

a shaft rotatably supported to said casing, said shaft having first and second ends, said second end being formed with groove means, said groove means including a ring groove formed on an outer periphery of said second end of said shaft;

a first conical plate fixed to said first end of said shaft;

a second conical plate axially movably engaged with said second end of said shaft, said second conical plate cooperating with said first conical plate to form a V-shaped groove;

chamber means engaged with said shaft for defining a hydraulic pressure cylinder chamber adjacent to said second conical plate on the side thereof failing to face said first conical plate, said hydraulic pressure cylinder chamber receiving hydraulic pressure to axially move said second conical plate;

ring means engaged with said groove means for restraining axial movement of said chamber means, said ring means including a ring engaged with one of said two ring grooves disposed near to said second conical plate and a retainer arranged to restrain radial movement of said ring; and a bearing engaged with said second end of said shaft and having outer and inner races, said bearing being disposed more distant from said second conical plate than said ring means, said bearing abutting on said retainer of said ring means to restrain an axial position thereof.

BRIEF DESCRIPTION OF THE DRAWINGS

FIG. 8 is a view similar to FIG. 8, showing a retainer used in the second embodiment.

DETAILED DESCRIPTION OF THE INVENTION

Figure 1:
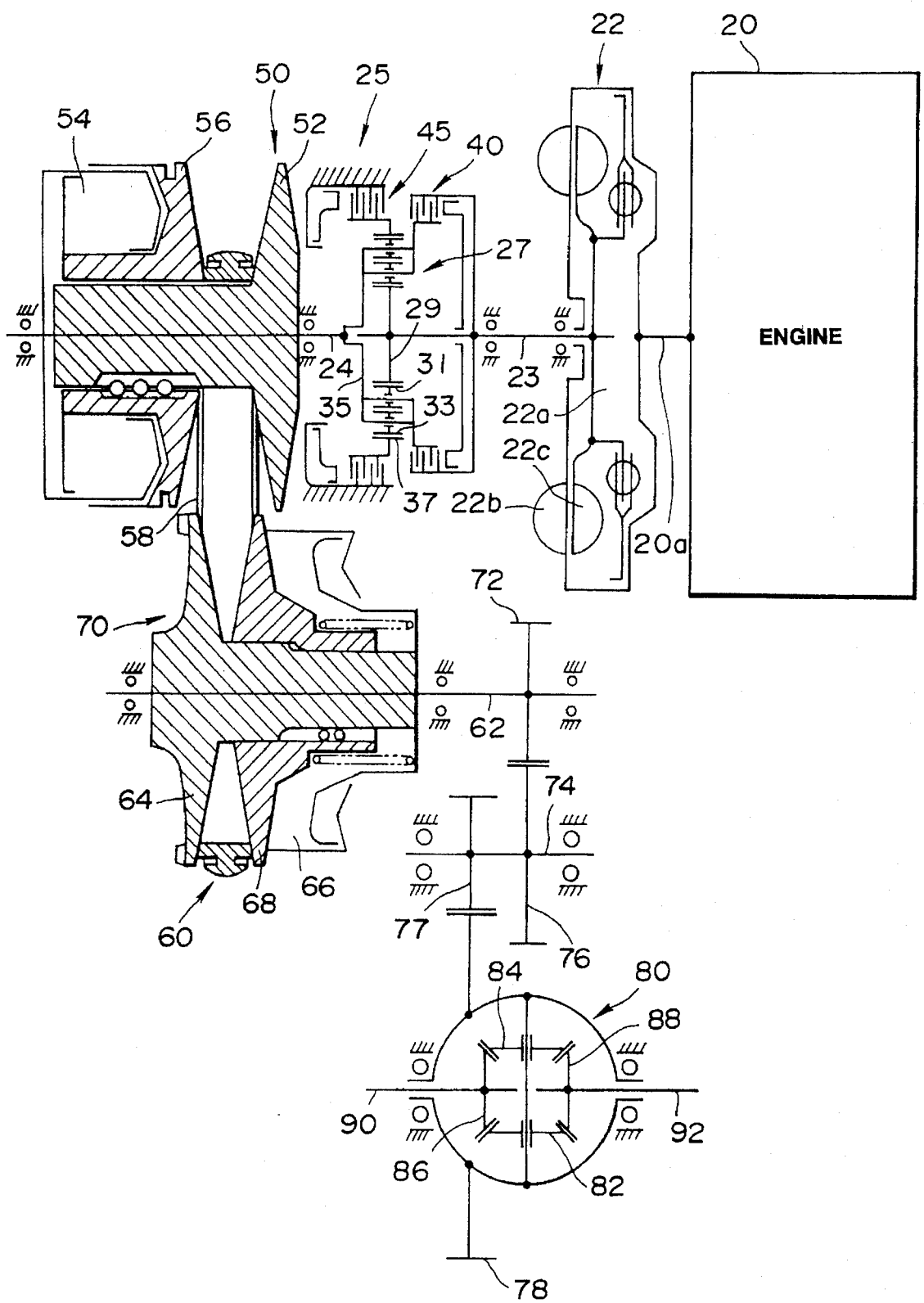
FIG. 1 is a schematic drawing showing a first preferred embodiment of a pulley device used in a power transmission train of a continuously variable V-belt transmission.

Referring to the drawings, a pulley device for a continuously variable V-belt transmission embodying the present invention will be described.

FIGS. 1–4 shows a first embodiment of the present invention. Referring to FIG. 1, an engine or drive source, designated generally by reference numeral 20, comprises an output shaft 20a to which a fluid coupling or hydraulic power transmission 22 is connected. The fluid coupling 22 provides a lockup device, and serves to mechanically connect/disconnect a pump impeller 22b on the input side to/from a turbine runner 22c on the output side by controlling a hydraulic pressure in a lockup chamber 22a.

The output side of the fluid coupling 22 is connected to a rotation shaft 23 which is in turn connected to a forward/reverse changeover device 25. The forward/reverse changeover device 25 comprises a planetary gear train 27, a forward clutch 40, and a reverse brake 45.

The planetary gear train 27 comprises a sun gear 29, a pinion carrier 35 having two pinion gears 31, 33, and an internal gear 37. The two pinion gears 31, 33 are engaged with each other, the pinion gear 31 being engaged with the sun gear 29, whereas the pinion gear 33 being engaged with the internal gear 37. The sun gear 29 is connected to the rotation shaft 23 to always rotate together therewith. The pinion carrier 35 can be connected to the rotation shaft 23 by the forward clutch 40. The internal gear 37 can be fixed to a stationary portion by the reverse brake 45. The pinion carrier 35 is connected to a drive shaft 24 disposed on the outer periphery of the rotation shaft 23, to which a drive pulley 50 is arranged.

The drive pulley 50 comprises a stationary conical plate 52 rotating together with the drive shaft 24, and a movable conical plate 56 disposed opposite to the stationary conical plate 52 to form a V-shaped pulley groove and being movable in the axial direction of the drive shaft 24 by a hydraulic pressure operating in a drive pulley cylinder chamber or drive pressure cylinder chamber 54. The drive pulley 50 is drivingly connected to a follower pulley 60 by a V-belt 58.

The follower pulley 60 is arranged to a follower shaft 62. The follower pulley 60 comprises a stationary conical plate 64 rotating together with the follower shaft 62, and a movable conical plate 68 disposed opposite to the stationary conical plate 64 to form a V-shaped pulley groove and being movable in the axial direction of the follower shaft 62 by a hydraulic pressure operating in a follower pulley cylinder chamber 66. These drive pulley 50, V-belt 58, and follower pulley 60 constitute a continuously variable V-belt transmission 70.

A drive gear 72 is fixed to the follower shaft 62, and is engaged with an idler gear 76 on an idler shaft 74. A pinion gear 77 arranged to the idler shaft 74 is always engaged with a final gear 78. Mounted to the final gear 78 is a pair of pinion gears 82, 84 which constitutes a differential device 80 and with which a pair of side gears 86, 88 is engaged, the side gears 86, 88 being engaged with output shafts 90, 92, respectively.

Torque input to the above power transmission device from the output shaft 20a of the engine 20 is transmitted to the forward/reverse changeover device 25 through the fluid coupling 22 and the rotation shaft 23. When the forward clutch 40 is in engagement, and the reverse brake 45 is in release, torque of the rotation shaft 28 is transmitted to the drive shaft 24 in the same direction of rotation through the planetary gear train 27 which is in unitary rotation. On the other hand, when the forward clutch 40 is in release, and the reverse brake 45 is in engagement, torque of the rotation shaft 23 is transmitted to the drive shaft 24 in the direction of rotation reversed by operation of the planetary gear train 27. Torque of the drive shaft 24 is transmitted to the differential gear 80 through the drive pulley 50, the V-belt 58, the follower pulley 60, the follower shaft 62, the drive gear 72, the idler gear 76, the idler shaft 74, the pinion gear 77, and the final gear 78 to rotate the output shafts 90, 92 in the forward or reverse direction. When both of the forward clutch 40 and the reverse brake 45 are in release, the power transmission device is in neutral.

Upon the above power transmission, the movable conical plate 56 of the drive pulley 50 and the movable conical plate 68 of the follower pulley 60 are moved axially to change a radius of contact with respect to the V-belt 58, enabling a change in the rotation ratio of the drive pulley 50 to the follower pulley 60. By way of example, if the width of the V-shaped pulley groove of the drive pulley 50 is increased, and the width of the V-shaped pulley groove of the follower pulley 50 is decreased, the V-belt 58 on the side of the drive pulley 50 has a radius of contact decreased, whereas the V-belt 58 on the side of the follower pulley 60 has a radius of contact increased, obtaining a great speed ratio. If the movable conical plates 56, 68 are moved in the reverse direction, a speed ratio becomes smaller in the opposite way as described above.

Figure 2:
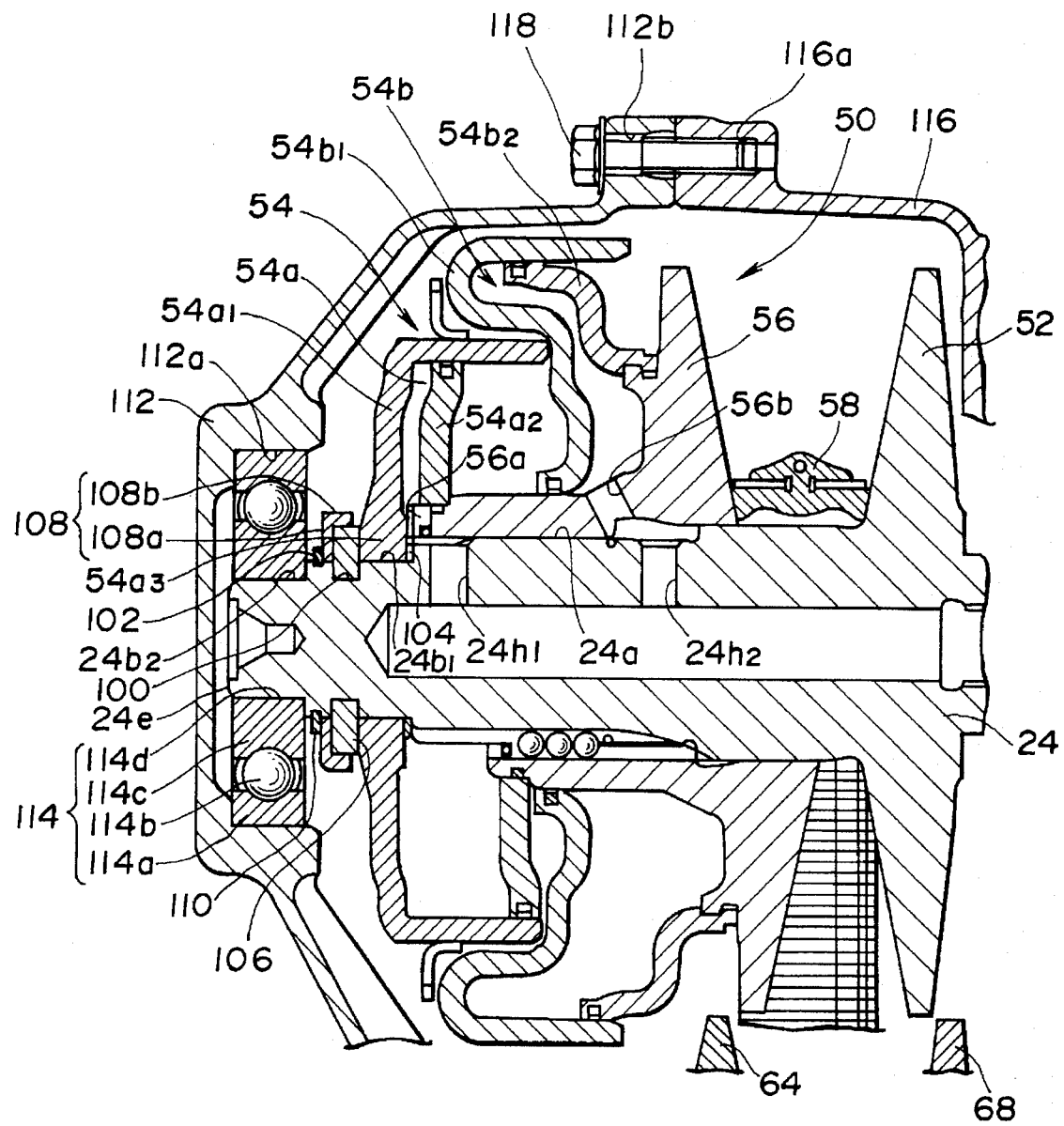
FIG. 2 is a sectional view showing a drive pulley.
Figure 3:
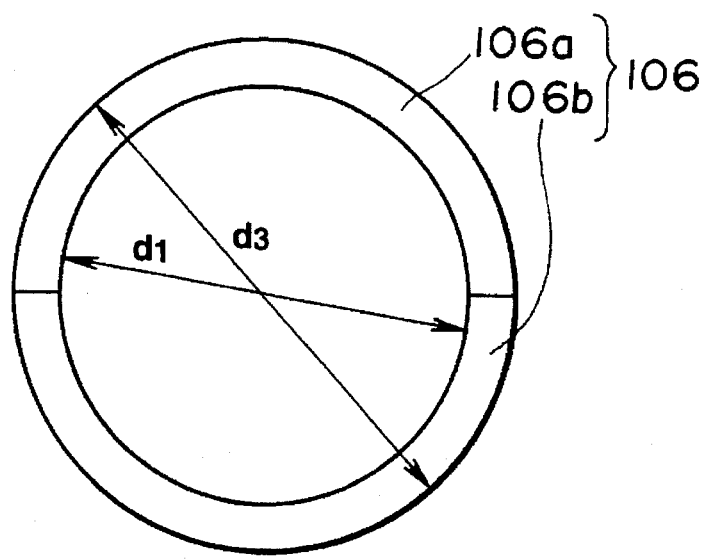
Figure 4:
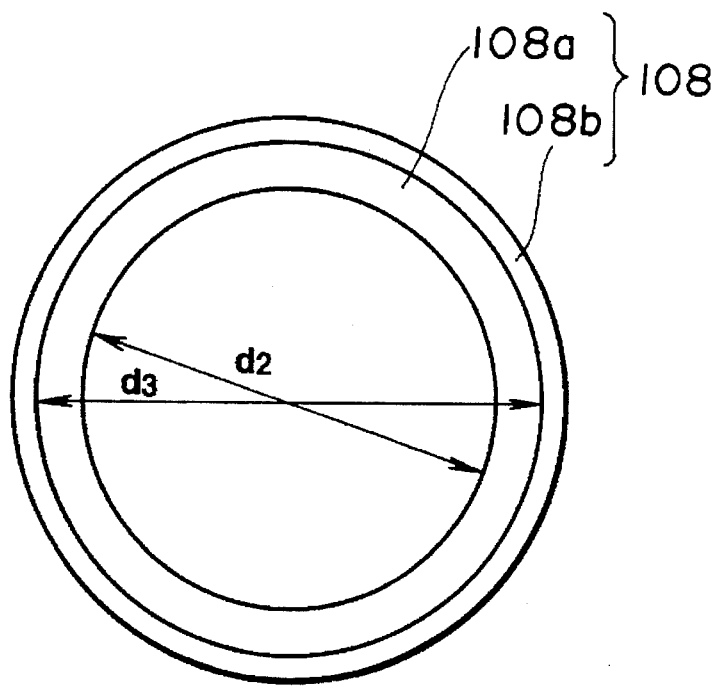
FIG. 4 is a view similar to FIG. 3, showing a retainer.

Referring next to FIGS. 2-4, a detailed description will be made with regard to the drive pulley 50 of the continuously variable V-belt transmission as shown in FIG. 1.

The drive pulley cylinder chamber 54 arranged on the rear side of the movable conical plate 56 which does not face the stationary conical plate 52 comprises first and second hydraulic chambers 54a, 54b. The first hydraulic chamber 54a is defined by a first cylinder member $54a_1$ and a first piston member $54a_2$, whereas the second hydraulic chamber 54b is defined by a second cylinder member $54b_1$ and a second piston member $54b_2$. The first hydraulic chamber 54a receives a hydraulic pressure through a first oil hole $24h_1$ formed in the drive shaft 24 and a second oil hole 56a formed in the movable conical plate 56. On the other hand, the second hydraulic chamber 54b receives a hydraulic pressure through a second oil hole $24h_2$ formed in the drive shaft 24 and a second oil hole 56b formed in the movable conical plate 56.

The drive shaft 24 has an end 24e to which the first cylinder member $54a_1$ is connected, and a slide portion 24a with which the movable conical plate 56 is outwardly engaged. The end 24e is shaped to have two reduced diameter portions with respect to the slide portion 24a. As for the two reduced diameter portions, the one continuously connected to the slide portion 24a is designated as a first reduced diameter portion or shank $24b_1$, and the other continuously connected to the first reduced diameter portion $24b_1$ is designated as a second reduced diameter portion or shank $24b_2$.

Two ring grooves 100, 102 are formed in the outer periphery of the first reduced diameter portion $24b_1$ to be axially separated from each other. When engaging ring members with the ring grooves 100, 102, the first cylinder member $54a_1$ is held and connected to the drive shaft 24 in the fluid tight way. An intermediate ring member 104 is arranged to a wall which forms the boundary between the slide portion 24a and the first reduced diameter portion $24b_1$, and it is disposed to abut on a side face of the first cylinder member $54a_1$.

On the outer periphery of the drive shaft 24, the ring groove 100 located on the side of the slide portion 24a is disposed nearer to the end 24e than a connected position of the first cylinder member $24a_1$. On the other hand, the ring groove 102 is disposed nearer to the end 24e than the ring groove 100, and has narrower width and shallower depth.

Engaged with the ring groove 100 is a C-shaped ring 108 on the side of an inner ring portion thereof, having the thickness established to be substantially the same as the width of the ring groove 100. Referring to FIG. 3, the C-shaped ring 108 comprises two circumferentially divided ring members 106a, 106b. An inner diameter $d_1$ of the inner ring portion defined by the ring members 106a, 106b is established to be substantially the same as the diameter of a bottom of the ring groove 100.

A ring-shaped retainer 108 is integrally disposed on the side of an outer ring portion of the C-shaped ring 106 engaged with the ring groove 100. Referring to FIG. 4, the retainer 108 has an inner diameter $d_2$ which is the same as the outer diameter of the first reduced diameter portion 24a, and it comprises a ring portion 108a having an outer diameter $d_3$ which is substantially the same as the outer diameter of the C-shaped ring 106, and a ring-shaped edge portion 108b which rises from the outer periphery of the ring portion 108a. When outwardly engaged with the first reduced diameter portion 24a, the ring portion 108a abuts on a side face of the C-shaped ring 106, and an inner wall of the edge portion 108b abuts on an outer peripheral face of the C-shaped ring 106, restraining radial movement of the ring members 106a, 106b which constitute the C-shaped ring 106.

A snap ring 110 is engaged with the ring groove 102 to abut on a side face of the retainer 108. When arranging the snap ring 110, the retainer 108 and the C-shaped ring 106 are pressed to the first cylinder member $54a_1$. A coupling portion $54a_3$ of the first cylinder member $54a_1$ is caulked by the C-shaped ring 106 and the intermediate ring member 104, so that the first cylinder member $54a_1$ is connected to the drive shaft 24.

A ball bearing 114 is arranged to the second reduced diameter portion $24b_2$. An inner wall of a side cover 112 facing the end 24e of the drive shaft 24 is formed with a circular recess 112a having the inner diameter established to be substantially the same as the outer periphery of an outer race 114a of the ball bearing 114. The ball bearing 114 is outwardly engaged with the second reduced diameter portion $24b_2$ of the drive shaft 24 with the outer race 114a press fitted in the circular recess 112a.

Next, a description will be made with regard to the procedure of assembling the drive pulley 50 of the present invention. Referring to FIG. 2, suppose that the side cover 112 is not attached to a casing main body 116 by a connecting bolt 118, and that the side cover 112 is not arranged on the side of the end 24e of the drive shaft 24.

First, the movable conical plate 56 is outwardly engaged with the drive shaft 24 up to the slide portion 24a. A coupling portion of the second piston member $54b_2$ is integrally mounted to the movable conical plate 56. An inner diameter portion of the second cylinder member $54b_1$ is outwardly engaged with the movable conical plate 56, and an inner diameter portion of the first piston member $54a_2$ is press fitted in the outer periphery of the movable conical plate 56. The intermediate ring member 104 is outwardly engaged with the first reduced diameter portion $24b_1$ which is the nearest to the slide portion 24a. The coupling portion $54a_3$ of the first cylinder member $54a_1$ is outwardly engaged with the drive shaft 24 up to a position to abut on the intermediate ring member 104. The ring members 106a, 106b are engaged with the ring groove 100 one after another.

The retainer 108 is outwardly engaged with the drive shaft 24 toward the C-shaped ring 106, and is disposed to be integrated with the C-shaped ring 106, the ring portion 108a abutting on the side face of the C-shaped ring 106, and the inner wall of the edge portion 108b abutting on the outer peripheral face of the C-shaped ring 106. The snap ring 110 having a diameter enlarged by a jig to be greater than a outer diameter of the first reduced diameter portion $24b_1$ is positioned on the outer periphery of the ring groove 102, and it is engaged therewith by removing enlargement of a diameter by the jig. At this time, the snap ring 110 engaged with the ring groove 102 serves to press the retainer 108 and the C-shaped ring 106 to the coupling portion $54a_3$ of the first cylinder member $54a_1$. In the state that the coupling portion $54a_3$ of the first cylinder member $54a_1$ is caulked by the C-shaped ring 106 and the intermediate ring member 104, the first cylinder member $54a_1$ is connected to the drive shaft 24.

Then, the outer race 114a of the ball bearing 114 is press fitted in the circular recess 112a of the side cover 112. Balls 114b and inner race 114c are disposed to the outer race 114a press fitted in the side cover 112. The ball bearing 114 as assembled is integrally disposed to the inner wall of the side cover 112. An inner diameter portion 114d of the ball bearing 114 is outwardly engaged with the second reduced diameter portion $24b_2$ of the drive shaft 24 so that a bolt hole 112a of the side cover 112 corresponds to a bolt hole 116a of the casing main body 116. The connecting bolt 118 is meshed with the bolt holes 112a, 116a, completing assembling of the drive pulley 24.

Thus, according to the drive pulley 50 of the present invention, the drive shaft 24 is formed with only the ring grooves 100, 102 and without a male screw which is seen in the conventional structure, enabling a great reduction in machining cost of the drive shaft 24.

Further, the first cylinder member $54a_1$ is integrally connected to the drive shaft 24 only through operation of engaging the C-shaped ring 106 with the ring groove 100, outwardly engaging the retainer 108 with the drive shaft 24, then engaging the snap ring 110 with the ring groove 102. Additionally, the ball bearing 114 is previously integrally disposed to the inner wall of the side cover 112, and is connected to the second reduced diameter portion $24b_2$ which is nearer to the end 24e than the first reduced diameter portion $24b_1$ having the C-shaped ring 106, the retainer 108, and the snap ring 110 disposed thereto. Therefore, as compared with the conventional structure, the structure of the present invention allows elimination of a number of assembling devices, e.g. a torque wrench and a caulker, resulting in easy assembling of the drive pulley 50 by the simple procedure.

Furthermore, the C-shaped ring 106 having radial movement restrained by the retainer 108 is constructed by the two circumferentially divided ring members 106a, 106b, enabling engagement with the ring groove 100 without difficulty, resulting in easy assembling of the drive pulley 50.

Still further, when engaging the snap ring 110 with the ring groove 102, the C-shaped ring 106 is pressed to the slide portion 24a, and the coupling portion $54a_3$ of the first cylinder member $54a_1$ is surely caulked by the C-shaped ring 106 and the intermediate ring member 104, so that the drive pulley cylinder chamber 54, particularly, the first hydraulic chamber 54a, can be formed in the high fluid tight way. Thus, when supplying a predetermined hydraulic pressure to the drive pulley cylinder chamber 54, the width of the V-shaped pulley groove can be increased or decreased with high accuracy, resulting in sure power transmission from the drive shaft 24 to the follower pulley 60 in a predetermined speed ratio.

Furthermore, the outer race 114a of the ball bearing 114 is press fitted in the circular recess 112a formed in the inner wall of the side cover 112, and the ball bearing 114 is outwardly engaged with the second reduced diameter portion 23b of the drive shaft 24, surely preventing occurrence of a clearance between the ball bearing 114 and the inner wall of the side cover 112 upon mounting, resulting in no possible wear of the bearing. Therefore, as compared with the conventional structure using a tightening force of the nut, the structure of the present invention allows easy assembling of the drive pulley 50.

Figure 5:
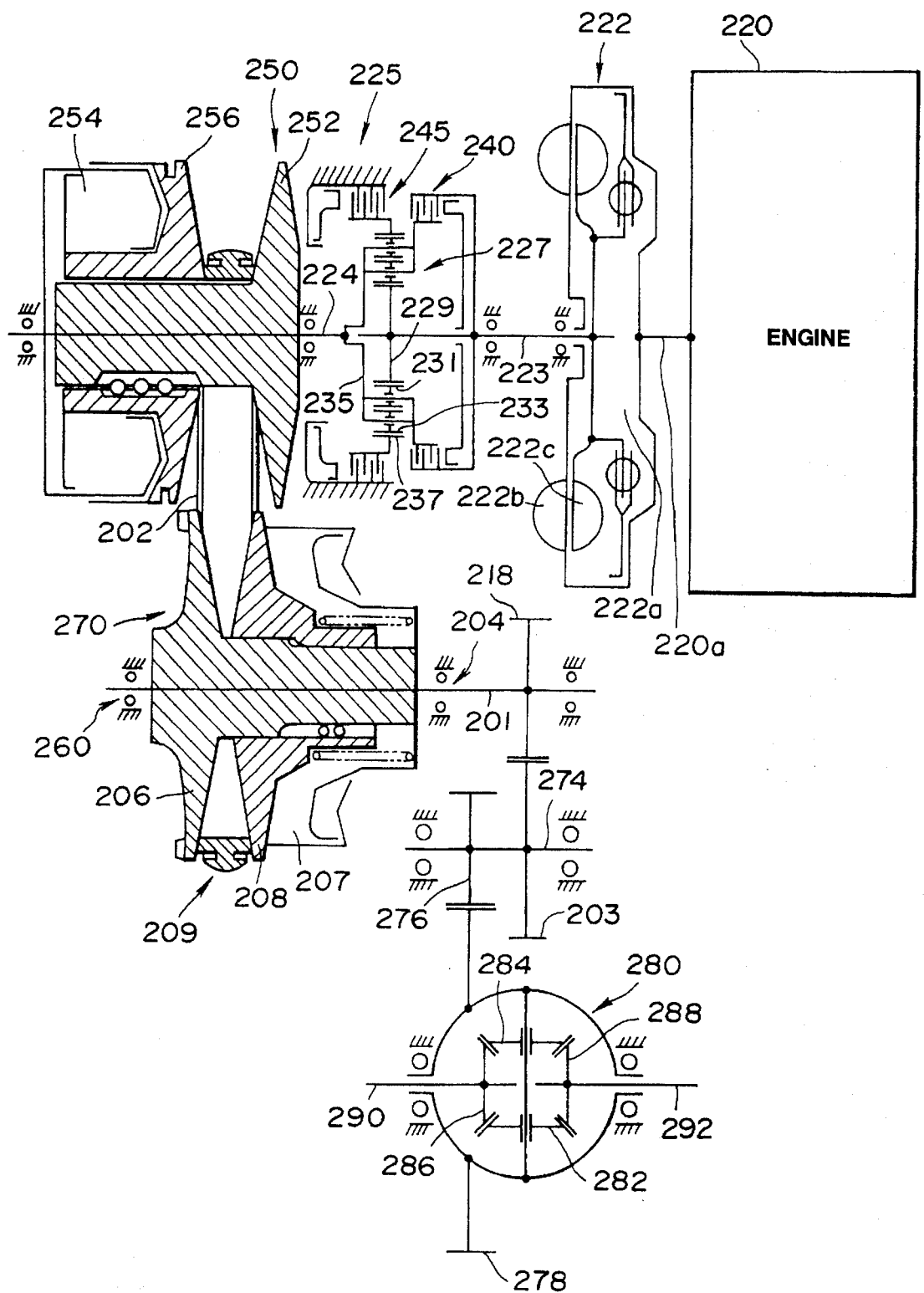
FIG. 5 is a view similar to FIG. 1, showing a second preferred embodiment of the present invention.

FIGS. 5–8 show a second embodiment of the present invention. Referring to FIG. 5, an engine or drive source, designated generally by reference numeral 220, comprises an output shaft 220a to which a fluid coupling or hydraulic power transmission 222 is connected. The fluid coupling 222 provides a lockup device, and serves to mechanically connect/disconnect a pump impeller 222b on the input side to/from a turbine runner 222c on the output side by controlling a hydraulic pressure in a lockup chamber 222a.

The output side of the fluid coupling 222 is connected a rotation shaft 223 which is in turn connected to a forward/reverse changeover device 225. The forward/reverse changeover device 225 comprises a planetary gear train 227, a forward clutch 240, and a reverse brake 245.

The planetary gear train 227 comprises a sun gear 229, a pinion carrier 235 having two pinion gears 231, 233, and an internal gear 237. The two pinion gears 231, 233 are engaged with each other, the pinion gear 231 being engaged with the sun gear 229, whereas the pinion gear 233 being engaged with the internal gear 237. The sun gear 229 is connected to the rotation shaft 223 to always rotate together therewith. The pinion carrier 235 can be connected to the rotation shaft 223 by the forward clutch 240. The internal gear 237 can be fixed to a stationary portion by the reverse brake 245. The pinion carrier 235 is connected to a drive shaft 224 disposed on the outer periphery of the rotation shaft 223, to which a drive pulley 250 is arranged.

The drive pulley 250 comprises a stationary conical plate 252 rotating together with the drive shaft 224, and a movable conical plate 256 disposed opposite to the stationary conical plate 252 to form a V-shaped pulley groove and being movable in the axial direction of the drive shaft 224 by a hydraulic pressure operating in a drive pulley cylinder chamber or drive pressure cylinder chamber 254. The drive pulley 250 is drivingly connected to a follower pulley 209 by a V-belt 202.

The follower pulley 209 is arranged to a follower shaft 201 having one end rotatably supported to a side cover 205 (see FIG. 6) through a bearing 204 and the other end rotatably supported thereto through a bearing 260. The follower pulley 209 comprises a stationary conical plate 206 rotating together with the follower shaft 201, and a movable conical plate 208 disposed opposite to the stationary conical plate 208 to form a V-shaped pulley groove and being movable in the axial direction of the follower shaft 201 by a hydraulic pressure operating in a follower pulley cylinder chamber 207. For supplying a hydraulic pressure to the follower pulley cylinder chamber 207, an oil hole 212 is formed through the follower shaft 201, whereas an oil hole 218 is formed through the movable conical plate 208. These drive pulley 250, V-belt 258, and follower pulley 209 constitute a continuously variable V-belt transmission 270.

A drive gear 218 integrated with the follower shaft 201 is engaged with an idler gear 203 on an idler shaft 274. A pinion gear 276 arranged to the idler shaft 274 is always engaged with a final gear 278. Mounted to the final gear 278 is a pair of pinion gears 282, 284 which constitutes a differential device 280 and with which a pair of side gears 286, 288 is engaged, the side gears 286, 288 being engaged with output shafts 290, 292, respectively.

Torque input to the above power transmission device from the output shaft 220a of the engine 220 is transmitted to the forward/reverse changeover device 225 through the fluid coupling 222 and the rotation shaft 223. When the forward clutch 240 is in engagement, and the reverse brake 245 is in release, torque of the rotation shaft 223 is transmitted to the drive shaft 224 in the same direction of rotation through the planetary gear train 227 which is in unitary rotation. On the other hand, when the forward clutch 240 is in release, and the reverse brake 245 is in engagement, torque of the rotation shaft 223 is transmitted to the drive shaft 224 in the direction of rotation reversed by operation of the planetary gear train 227. Torque of the drive shaft 224 is transmitted to the differential gear 280 through the drive pulley 250, the V-belt 202, the follower pulley 209, the follower shaft 201, the drive gear 218, the idler gear 203, the idler shaft 274, the pinion gear 276, and the final gear 278 to rotate the output shafts 290, 292 in the forward or reverse direction. When both of the forward clutch 240 and the reverse brake 245 are in release, the power transmission device is in neutral.

Upon the above power transmission, the movable conical plate 256 of the drive pulley 250 and the movable conical plate 208 of the follower pulley 209 are moved axially to change a radius of contact with respect to the V-belt 202, enabling a change in the rotation ratio of the drive pulley 250 to the follower pulley 260. By way of example, if the width of the V-shaped pulley groove of the drive pulley 250 is increased, and the width of the V-shaped pulley groove of the follower pulley 209 is decreased, the V-belt 202 on the side of the drive pulley 250 has a radius of contact decreased, whereas the V-belt 202 on the side of the follower pulley 209 has a radius of contact increased, obtaining a great speed ratio. If the movable conical plates 256, 208 are moved in the reverse direction, a speed ratio becomes smaller in the opposite way as described above.

Figure 6:
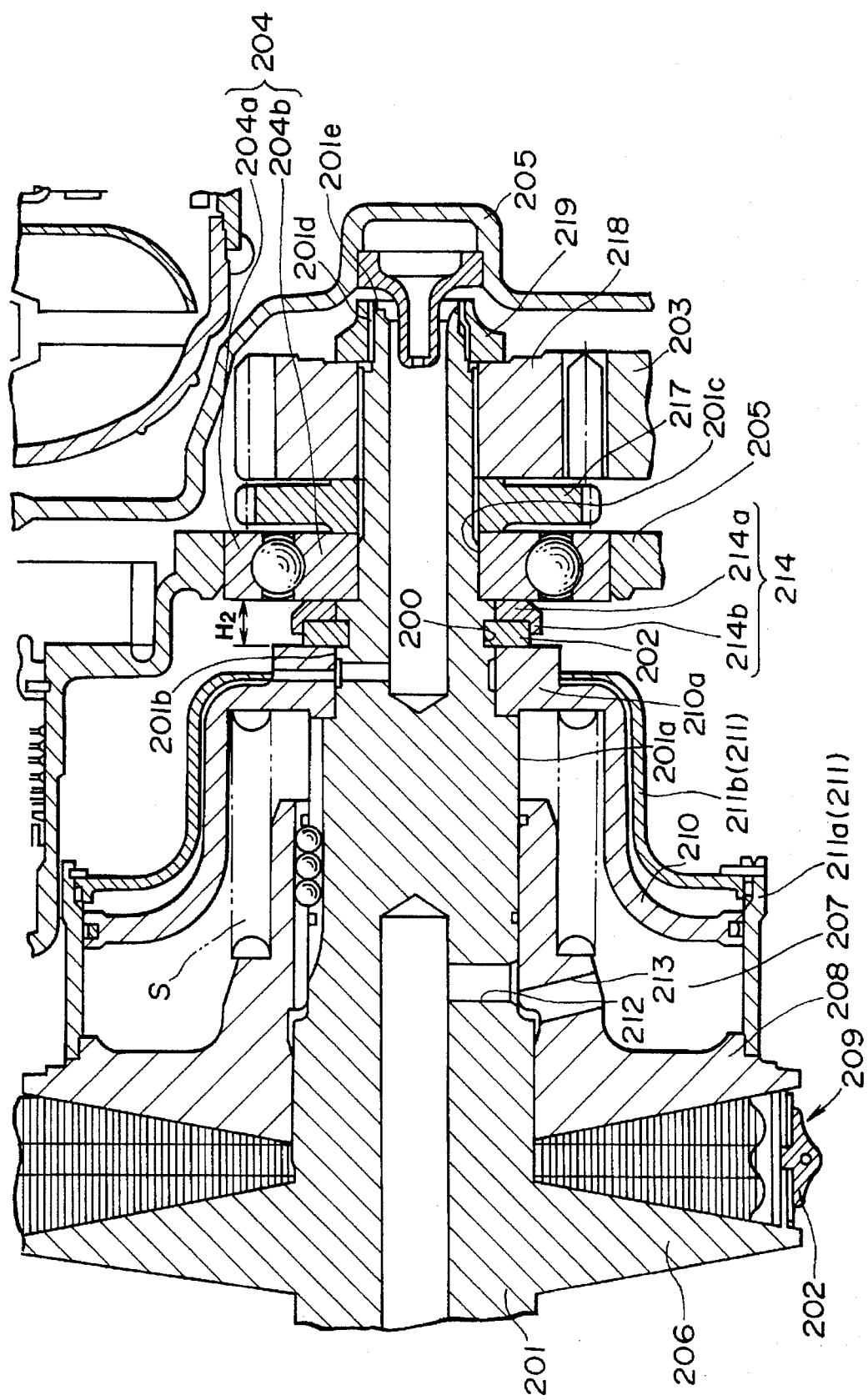
FIG. 6 is a view similar to FIG. 2, showing a follower pulley.
Figure 7:
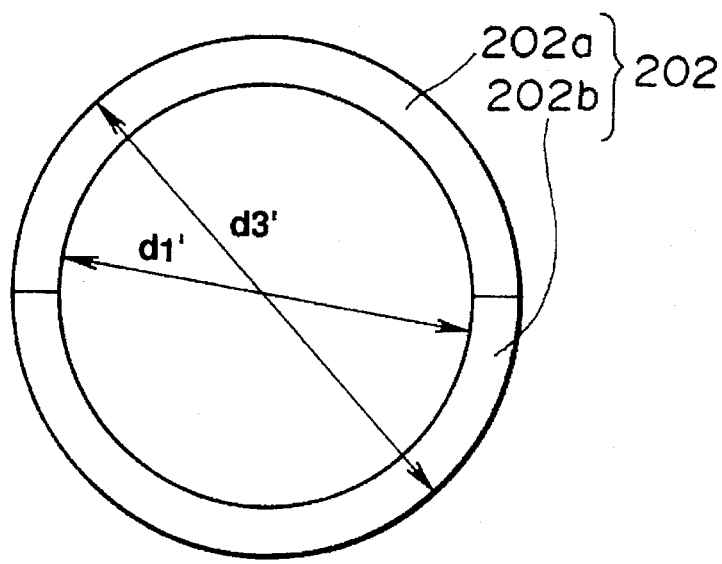
FIG. 7 is a view similar to FIG. 4, showing a C-shaped ring used in the second embodiment.
Figure 8:
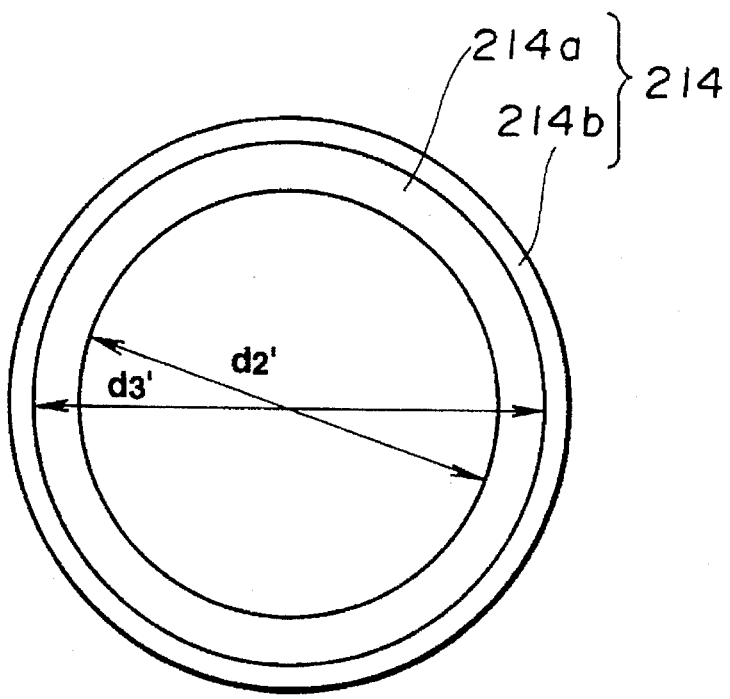
FIG. 8 is a front view showing a C-shaped ring.

Referring next to FIGS. 6–8, the structure of the follower pulley 209 of the present invention will be described in detail.

One end of the follower shaft 201 having the bearing 204 disposed thereon is shaped to have three reduced diameter portions with respect to a slide portion 201a with which the movable conical plate 208 is outwardly engaged. A coupling portion 210a of a cylinder member 210 is outwardly engaged with the follower shaft 201 in a first reduced diameter portion or shank 201b.

In this embodiment, a ring groove 200 is formed on the outer periphery of the first reduced diameter portion 201b. When engaging a ring member or C-shaped ring 202 with the ring groove 200, and disposing the bearing 204 outwardly engaged with the follower shaft 201 in the press fit way to abut on the ring member, the cylinder member 210 is held and connected to the follower shaft 201 in the fluid tight way.

Specifically, the ring groove 200 is formed nearer to an end 201e than an engaged position of the coupling portion 210a. Engaged with the ring groove 200 is the C-shaped ring 202 on the side of an inner ring portion thereof, having the thickness established to be substantially the same as the width of the ring groove 200. Referring to FIG. 7, the C-shaped ring 202 comprises two circumferentially divided ring members 202a, 202b. An inner diameter $d_1$, of the inner ring portion defined by the ring members 202a, 202b is established to be substantially the same as the diameter of a bottom of the ring groove 200. When engaging the C-shaped ring 202 with the ring groove 200, the coupling portion 210a of the cylinder member 210 is pressed to the slide portion 201a.

A ring-shaped retainer 214 is integrally disposed on the side of an outer ring portion of the C-shaped ring 202 engaged with the ring groove 200. Referring to FIG. 8, the retainer 214 has an inner diameter $d_2$, which is the same as the outer diameter of the first reduced diameter portion 201b, and it comprises a ring portion 214a having an outer diameter $d_3$, which is substantially the same as the outer diameter of the C-shaped ring 202, and a ring-shaped edge portion 214b which rises from the outer periphery of the ring portion 214a. When outwardly engaged with the first reduced diameter portion 201b, the ring portion 214a abuts on a side face of the C-shaped ring 202, and an inner wall of the edge portion 214b abuts on an outer peripheral face of the C-shaped ring 202, restraining radial movement of the ring members 202a, 202b which constitute the C-shaped ring 202.

As for the bearing 204 outwardly engaged with a second reduced diameter portion 201c, the inner race 204b has an inner diameter established to be substantially the same as an outer diameter of the second reduced diameter portion 201c, and it is outwardly engaged therewith in the press fit way to have a side face abutting on a side face of the retainer 214. Thus, axial movement of the retainer 214 is restrained.

Next, the procedure of assembling the follower pulley 209 of the present invention will be described.

First, after connecting a first member 211a to the movable conical plate 208, the movable conical plate 208 is outwardly engaged with the slide portion 201a of the follower shaft 201 to cooperate with the stationary conical plate 206 to form the V-shaped pulley groove. The coupling portion 210a of the cylinder member 210 is outwardly engaged with the follower shaft 201 through a spring S, and a second member 211b is outwardly engaged therewith. The ring members 201a, 201b are engaged with the ring groove 200 one after another. Then, the retainer 214 is outwardly engaged with the follower shaft 201 toward the C-shaped ring 202, and is disposed to be integrated with the C-shaped ring 202, the ring portion 204a abutting on the side face of the C-shaped ring 202, and the inner wall of the edge portion 204b abutting on the outer peripheral face of the C-shaped ring 202. The bearing 204 is outwardly engaged with the second reduced diameter portion 201c in the press fit way so that the side face of the inner race 204b abuts on the side face of the retainer 214. A parking gear 217 and drive gear 218 are outwardly engaged with the second reduced diameter portion 201c, and are connected to the follower shaft 201 by meshing a second nut 219 with a third reduced diameter portion 218 formed with a male screw. The follower shaft 201 is disposed so that the outer race 204a of the bearing 204 abuts on the inner wall of the side cover 205, completing assembling of the follower pulley 209.

Thus, according to the follower pulley 209 of the present invention, the first reduced diameter portion 201b of the follower shaft 201 is formed with only the ring groove 200 and without a male screw nor a caulking groove which are seen in the conventional structure, enabling a great reduction in machining cost of the follower shaft 201.

Further, the cylinder member 210 is integrally connected to the follower shaft 201 only through operation of engaging the C-shaped ring 202 with the ring groove 200, outwardly engaging the retainer 214 with the follower shaft 201, then making the side face of the bearing 204 outwardly engaged with the second reduced diameter portion 201c in the press fit way abut on the side face of the retainer 214. Therefore, as compared with the conventional structure, the structure of the present invention allows easy assembling of the follower pulley 209 by the simple procedure.

Furthermore, the C-shaped ring 202 having radial movement restrained by the retainer 214 is constructed by the two circumferentially divided ring members 202a, 202b, enabling engagement with the ring groove 200 without difficulty, resulting in easy assembling of the follower pulley 209.

Still further, when the C-shaped ring 202 is engaged with the ring groove 200, the coupling portion 210a of the C-shaped ring 202 is pressed to the slide portion 201a, so that the follower pulley cylinder chamber 207 can be formed in the high fluid tight way. Thus, when supplying a predetermined hydraulic pressure to the follower pulley cylinder chamber 207, the width of the V-shaped pulley groove can be increased or decreased with high accuracy, resulting in sure power transmission from the follower shaft 201 to the differential device 280 through the idler gear 203.

Furthermore, the first reduced diameter portion 201b is not formed with a male screw and a caulking groove, so that an axial length $H_2$ between the coupling portion 210a and the bearing 204 can be shortened, enabling a reduction in the axial size of the follower pulley 209, resulting in providing of the continuously variable V-belt transmission 270 available to small motor vehicles.

Having described the present invention in connection with the preferred embodiments, it is noted that the present invention is not limited thereto, and various changes and modifications can be made without departing from the spirit of the present invention. By way of example, in the embodiments, the C-shaped ring is constructed by two circumferentially divided portions, alternatively, it can be constructed in the other way.

What is claimed is:

1. A pulley device for a continuously variable transmission, comprising:
   a casing;
   a shaft rotatably supported to said casing, said shaft having first and second ends, said second end being formed with at least one groove, said at least one groove including a ring groove formed on an outer periphery of said second end of said shaft;
   a first conical plate fixed to said first end of said shaft;
   a second conical plate axially movably engaged with said second end of said shaft, said second conical plate cooperating with said first conical plate to form a V-shaped groove;
   a hydraulic pressure cylinder chamber engaged with said shaft and adjacent to said second conical plate, said hydraulic pressure cylinder chamber receiving hydraulic pressure to axially move said second conical plate;
   a ring engaged with said ring groove of said shaft, said ring restraining axial movement of said chamber;
   a retainer arranged adjacent to said ring, said retainer restraining radial movement of said ring; and
   a bearing engaged with said second end of said shaft and having outer and inner races, said bearing being disposed more distant from said second conical plate than said retainer, said bearing abutting on said retainer to restrain axial movement thereof.

2. A pulley device as claimed in claim 1, wherein said ring is formed in a C-shape, said ring having a plurality of circumferentially divided portions, said ring having a thickness substantially equal to said ring groove and an inner diameter substantially equal to a diameter of a bottom of said ring groove.

3. A pulley device as claimed in claim 1, wherein said retainer is formed in a ring-shape, said retainer including a ring portion having an outer diameter substantially equal to that of said ring, and a ring-shaped edge portion disposed on an outer periphery of said ring.

4. A pulley device for a continuously variable transmission, comprising:
   a casing;
   a shaft rotatably supported to said casing, said shaft having first and second ends, said second end having a ring groove formed on an outer periphery thereof;
   a first conical plate fixed to said first end of said shaft;
   a second conical plate axially movably engaged with said second end of said shaft, said second conical plate cooperating with said first conical plate to form a V-shaped groove;
   a hydraulic pressure cylinder chamber engaged with said shaft and adjacent to said second conical plate, said hydraulic pressure cylinder chamber receiving hydraulic pressure to axially move said second conical plate;
   a ring engaged with said ring groove of said shaft, said ring restraining axial movement of said chamber; and
   a retainer arranged adjacent to said ring, said retainer restraining radial movement of said ring.

5. A pulley device as claimed in claim 4, wherein said ring is formed in a C-shape, said ring having a plurality of circumferentially divided portions, said ring having a thickness substantially equal to said ring groove and an inner diameter substantially equal to a diameter of a bottom of said ring groove.

6. A pulley device as claimed in claim 4, wherein said retainer is formed in a ring-shape, said retainer including a ring portion having an outer diameter substantially equal to that of said ring, and a ring-shaped edge portion disposed on an outer periphery of said ring.

7. A pulley device as claimed in claim 4, further comprising a bearing engaged with said second end of said shaft and having outer and inner races, said bearing being disposed more distant from said second conical plate than said retainer.

8. A pulley device as claimed in claim 7, wherein said casing is formed with a recess having a diameter substantially equal to a diameter of said outer race of said bearing.

9. A pulley device as claimed in claim 7, wherein said bearing abuts on said retainer to restrain axial movement thereof.

10. A pulley device for a continuously variable transmission, comprising:
    a casing formed with a recess;
    a shaft rotatably supported to said casing, said shaft having first and second ends, said second end having a ring groove formed on an outer periphery thereof;
    a first conical plate fixed to said first end of said shaft;
    a second conical plate axially movably engaged with said second end of said shaft, said second conical plate cooperating with said first conical plate to form a V-shaped groove;

a hydraulic pressure cylinder chamber engaged with said shaft and adjacent to said second conical plate, said hydraulic pressure cylinder chamber receiving hydraulic pressure to axially move said second conical plate;

a ring engaged with said ring groove of said shaft, said ring restraining axial movement of said chamber;

a retainer arranged adjacent to said ring, said retainer restraining radial movement of said ring; and a bearing engaged with said second end of said shaft and having outer and inner races, said bearing being disposed more distant from said second conical plate than said retainer, said outer race having a diameter substantially equal to a diameter of said recess of said casing.

11. A pulley device as claimed in claim 10, wherein said ring is formed in a C-shape, said ring having a plurality of circumferentially divided portions, said ring having a thickness substantially equal to said ring groove and an inner diameter substantially equal to a diameter of a bottom of said ring groove.

12. A pulley device as claimed in claim 10, wherein said retainer is formed in a ring-shape, said retainer including a ring portion having an outer diameter substantially equal to that of said ring, and a ring-shaped edge portion disposed on an outer periphery of said ring.

* * * * *